June 16, 1953

C. R. ZIMMER 2,642,010

DEVICE FOR DEPOSITING CENTERS IN CANDY PIECES

Filed Oct. 20, 1950

INVENTOR:
Clyde R. Zimmer
By:
Gary, Desmond & Parker
Attorneys

June 16, 1953  C. R. ZIMMER  2,642,010
DEVICE FOR DEPOSITING CENTERS IN CANDY PIECES
Filed Oct. 20, 1950  7 Sheets-Sheet 2

FIG. 2.

INVENTOR:
Clyde R. Zimmer
By:
Gary, Desmond & Parker
Attorneys

June 16, 1953 C. R. ZIMMER 2,642,010
DEVICE FOR DEPOSITING CENTERS IN CANDY PIECES
Filed Oct. 20, 1950 7 Sheets-Sheet 6

INVENTOR:
Clyde R. Zimmer
By:
Gary, Desmond & Parker
Attorneys

June 16, 1953 — C. R. ZIMMER — 2,642,010
DEVICE FOR DEPOSITING CENTERS IN CANDY PIECES
Filed Oct. 20, 1950 — 7 Sheets-Sheet 7

INVENTOR:
Clyde R. Zimmer
By: Gary, Desmond & Parker
Attorneys

Patented June 16, 1953

2,642,010

UNITED STATES PATENT OFFICE 2,642,010

DEVICE FOR DEPOSITING CENTERS IN CANDY PIECES

Clyde R. Zimmer, Chicago, Ill., assignor to E. J. Brach & Sons, Chicago, Ill., a corporation of Illinois Application October 20, 1950, Serial No. 191,244

11 Claims. (Cl. 107—1)

This invention relates to improvements in a machine for depositing cores or centers into continuously passing candy molds, and refers particularly to a machine for conveying a predetermined number of unit cores or centers, such as, fruit or nut cores or centers for candies, from a hopper containing a mass of such cores or centers, and depositing the unit cores or centers in individual mold cavities provided in a continuously moving mold.

In the manufacture of candy of the type which comprises fruit or nut centers embedded in candy cream, such as, for instance, the well known chocolate covered creams having cherries embedded in their centers, it is desirable that a single cherry devoid of an excessive amount of juice, which accompanies said cherries, be embedded in each piece of candy. If more than one cherry is embedded in the candy, difficulty is encountered in completely covering the core with the candy cream and the chocolate, rendering subsequent handling and packaging difficult and resulting generally in an unsatisfactory product from the consumer's viewpoint. If an excessive amount of juice accompanied the cherries the finished candies are prone to be unsatisfactory due to leakage of the juice from candy and the candies are undesirably "messy" to eat, the juices tending to leak or squirt out when the candies are bitten.

The ideal manner of preparing such candies, candy with cherry centers being again referred to as an example, is to form a mold for the reception of the cherry and embedding candy cream; deposit a single cherry devoid of excessive juice into the mold cavity; deposit candy cream in the mold cavity which contains the cherry, the cream completely filling the cavity and completely surrounding the cherry; and, subsequently coat the completely embedded cherry together with the embedding cream with chocolate or other desired outer covering.

In view of the fact that fruit centers for candies, particularly cherries, are soft and mushy, juicy and tend to be adhesive, they cannot be conveniently segregated into units devoid of excessive juice and the ideal procedure, hereinbefore described, is difficult of attainment, particularly as an efficient and rapid mechanical operation.

The present invention is particularly directed to a machine which effectively approaches the ideal operation, having provision for segregating the unit cores or centers from a mass of such cores or centers, removing excess juices, and depositing said unit centers in continuously advancing preformed mold cavities as a continuous, completely automatic operation.

The structural details, advantages and features of the present invention will be more apparent from the accompanying drawings and following detailed description.

Although the present invention is not intended to be limited to the specific type of candy which is made thereon, for purposes of illustrating the principles of the invention and describing the various structural features of the machine comprising the concepts of the invention, the machine will be described in conjunction with the manufacture of chocolate covered cream candies with cherry centers. Of course, the machine may be employed in conjunction with other fruit or nut centered candies.

Referring in detail to the drawings, 1 and 2 indicate spaced standards upon which the machine is mounted. A frame plate 3 is mounted upon the standard 1 and a frame plate 4 is mounted upon the standard 2, the frame plates 3 and 4 being substantially vertically disposed and being spaced from each other.

The present machine may be employed with the usual candy making machine which comprises a conveyor for continuously moving mold trays in seriatim. The reference numbers 5—5 indicate a pair of longitudinal rails upon which a pair of conveyor chains 6—6 move, mold trays 7 being carried by the conveyor chains 6—6. Each mold tray comprises a relatively shallow box in which a quantity of finely divided material such as starch is carried. In the upper surface of the starch mass carried in each of the trays 7 mold indentations or cavities 8 are provided, said cavities being intended generally to conform with or control the configuration or shape of the candy which is being made. In employing the present machine the frame members 1 and 2 are disposed upon each side of the rails 5—5 and chains 6—6, the arrangement being such that the trays 7 are moved in a continuous manner in seriatim between the frame plates 3 and 4.

A pair of brackets 9—9 are secured to the standards 1 and 2, said brackets supporting screws 10. The screws 10 are threadedly engaged in nuts 11 which are respectively rigidly secured as by welding to offset flanges 12 which are carried at the ends of a transverse bar 13. The bar 13 supports the rails 5—5 and by manipulation of the screws 10 by means of handles 14 the transverse bar 13 may be raised or lowered or properly leveled in order to dispose the rails 5—5 in a desired position. In order to properly position the trays 7 in a lateral direction, as said trays are carried between the frame plates 3 and 4, opposite guide bars 15 are positioned adjacent each of the frame members 3 and 4, said guide bars being carried by brackets 16. The guide bars 15 at opposite sides of the machine are so spaced as to function as guides for the lateral sides of the trays 7 which pass between the frame plates 3 and 4.

As will be hereinafter more fully described, the present machine is adapted to deposit cherries, such as the usual "Maraschino" cherry, in the mold cavities 8, one cherry devoid of an excess amount of accompanying juice being deposited in each of the mold cavities. The operation of depositing the cherries in the mold cavities 8 is a continuous operation and the disposition of the cherries is accomplished during the continuous forward movement of the trays 7 upon the conveyor chains 5—5.

A shaft 17 is journaled in bearings 18 and 19 which are respectively carried by the frame plates 3 and 4. A shaft 20 is journaled in bearings 21 and 22 respectively carried by the frame plates 3 and 4, shafts 17 and 20 being spaced from each other. A sprocket wheel 23 is carried adjacent one end of shaft 17 and at its opposite end a sprocket wheel 24 is carried, both of said sprocket wheels being rigidly mounted upon the shaft 17. Similarly a sprocket wheel 25 is mounted adjacent one end of shaft 20 and a sprocket wheel 26 is mounted on said shaft adjacent its opposite end. Sprocket wheels 24 and 26 are disposed in alignment with each other adjacent the frame plate 4 and sprocket wheels 23 and 25 are also disposed in alignment with each other adjacent frame plate 3. A sprocket chain 27 is trained around the sprocket wheels 23 and 25 and a sprocket chain 28 is trained around sprocket wheels 24 and 26.

Sprocket chain 27 carries a plurality of angle shaped brackets 29 and sprocket chain 28 similarly carries a corresponding plurality of angle shaped brackets 30. Mounted upon each opposite pair of brackets 29 and 30 is a recessed bar or pan 31, the respective bars being secured to the brackets 29 and 30 by means of screws 32.

Each of the bars 31 are provided with a plurality of recesses 33 which are disposed adjacent each other along substantially the entire length of each bar. The recesses 33 are substantially circular in cross section but may be formed of any desired sectional configuration. The recesses 33, as will be hereinafter more fully described, are adapted to carry the unit cherries from a mass of cherries contained in a hopper and deposit them in the mold cavities 8, one cherry from each recess 33 being deposited in one mold cavity 8.

Each bar 31 carries on its opposite sides plates 34 which are secured to the bar 31 by means of screws 35 or the like. Adjacent one face of each of the bars the plates 34 are turned inwardly to provide elongated flanges 36 along an intermediate portion of the edges of each bar, said flanges being spaced from the face of each bar to function as guides for a slidable valve or closure plate 37 which is slidably positioned upon that face of each of the bars to which the recesses 33 open. A lug 38 is secured, preferably by welding, to one end of each of the slidable plates 37, said lug extending upwardly from the plane of each of the slidable plates. Each of the plates 37 is provided with a plurality of circular apertures 39 which are spaced from each other along the length of the plates in substantial conformity with the spacing of the recesses 33 provided in the bars 31.

The arrangement is such that the plates 37 may be slidably moved upon the faces of the bars 31 to bring the apertures 39 into registration with the mouths of the recesses 33 or said plates may be slidably moved so as to offset the apertures 39 with respect to the mouths of the recesses 33. As will be hereinafter more fully described after a cherry has been deposited in each of the recesses 33, the apertures 39 being in registration with the mouths of the recesses during the depositing of the cherries in the recesses, the cherries may be effectively confined in said recesses by shifting the bars 37 so as to offset the apertures 39 from the mouths of the recesses 33. When the bars 37 have been shifted so as to be offset with respect to the mouths of the recesses 33, those portions of each plate 37 between apertures 39 are disposed immediately above the mouths of the recesses 33, a complete closure of the mouths of said recesses not being effected. However, the area of the mouths of the recesses which are closed is sufficient to prevent, when the bars are inverted, the cherries contained in the recesses from falling out of the recesses. Yet, if juice or liquid is contined in the recesses, and said bars are inverted said juice or liquid can escape from the recesses.

Although the bars 31 are shown and described as comprising solid rectangular bars having bores comprising the recesses 33, the bars or pans 31 may be, if desired, constructed of sheet metal wherein indentations have been stamped or otherwise formed to provide recesses equivalent to the recesses 33 herein shown and described.

A shaft 40 is journaled in the opposite supporting standards 1 and 2 and a sprocket wheel 41 is rigidly secured to said shaft. The sprocket wheel 41 is driven by sprocket chain 42 from a source of power (not shown) which is timed with the movement of the conveyor chains 5—5. Hence, the shaft 40 is driven in a continuous manner.

A crank arm 43 is rigidly secured to one end of shaft 40, the crank arm being pivotally connected to a sleeve 44 which is threadedly connected to a link 45. The opposite end of the link 45 threadedly connects with clevis 46 which, in turn, is pivotally secured, as at 47 in Fig. 3, to an intermediate portion of lever 48, the latter being pivotally mounted at 49 to the supporting standard 2.

The upper end of the lever 48 is provided with a plurality of spaced apertures 50, in one of which a pin 51 pivotally connects the arm 48 to clevis 52. By the provision of the spaced apertures 50 the clevis 52 may be connected at a desired portion of the length of arm 48 whereby the effective throw of the arm may be changed. A screw 53 is threadedly connected to the clevis 52 at one end and at the opposite end is threadedly connected in block 54 pivotally carried upon a pin 55. Pin 55 extends through a threaded sleeve 56 and also extends through an elongated slot 57 provided in a lever arm 58. A lug 59 is rigidly mounted upon lever arm 58 and is provided with internal threads for the reception of screw 60, the opposite end of which is threadedly carried upon sleeve 56.

Figure 1:
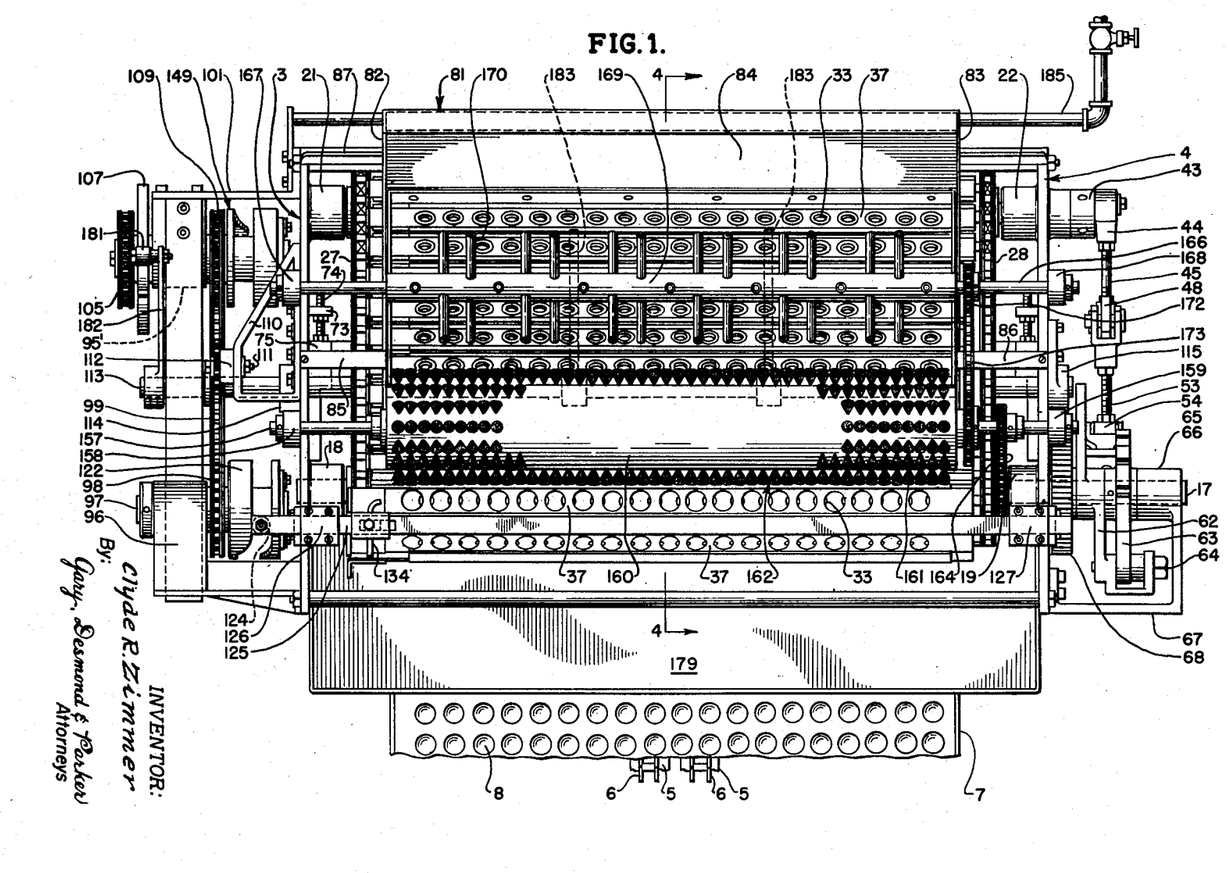
Fig. 1 is a top plan view of the machine comprising the concepts of the present invention.
Figure 3:
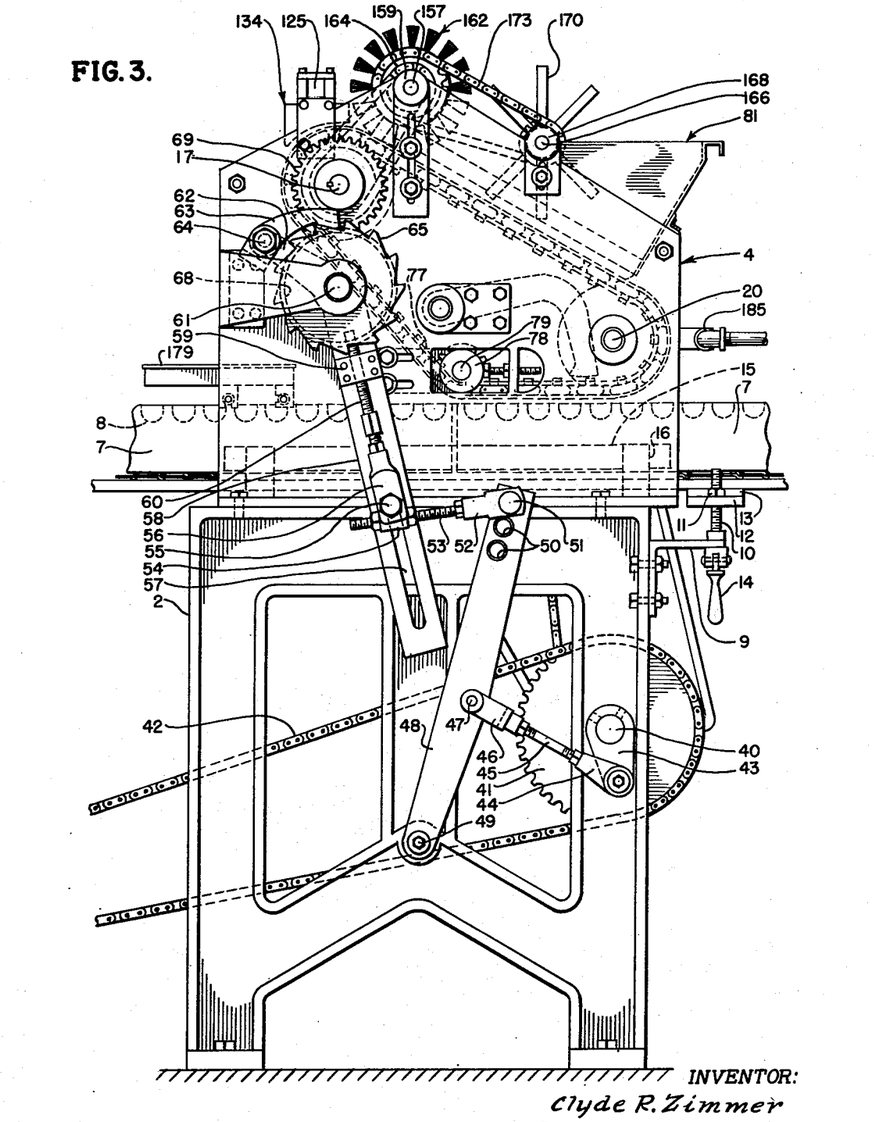
Fig. 3 is an end elevation of said machine, being the opposite end from that illustrated in Fig. 2.

Arm 58 adjacent its upper end is loosely mounted upon a shaft 61 and said arm comprises an extension 62 to which a pawl 63 is pivotally secured as at 64 in Fig. 3. A ratchet wheel 65 is rigidly secured to shaft 61 and pawl 63 cooperates with the teeth of the ratchet wheel. Shaft 61 is journaled in frame plate 4 at one end and at its opposite or outer end is journaled in bearing 66 (Fig. 1), said bearing being carried by a bracket 67 which, in turn, is mounted upon the frame plate 4.

The arrangement is such that when shaft 40 is rotated link 45 functions to rock arm 48 about its pivot 49. By virtue of the connection between the end of arm 48 and lever arm 58, a rocking motion is imparted to the lever arm 58. This motion, in turn, rocks extension 62 thereby causing pawl 63 to alternately positively engage the teeth of ratchet wheel 65 and alternately slide over said teeth. By virtue of the threaded connection 53 between arm 48 and lever arm 58 and also by virtue of the threaded member 60 the throw imparted to the lever arm 58 and hence the movement of pawl 63 may be controlled. In this fashion an intermittent movement is imparted to shaft 61.

A spur gear 68 is rigidly secured to shaft 61, said spur gear meshing with spur gear 69 which is keyed to shaft 17. The arrangement is such that the intermittent movement of shaft 61 is imparted to shaft 17 and in view of the fact that sprocket wheels and chains hereinbefore described connect shaft 17 to shaft 20 the recessed bars or pans 31 are carried intermittently with the chains 27 and 28.

A plate 70 is adjustably mounted upon frame plate 3, the frame plate being provided with a pair of parallel slots 71 in which screws 72 are adjustably positioned to hold the plate 70. A lug 73 (Fig. 1) carries a threaded screw 74 which bears upon a bearing 75 which latter is carried by plate 70. An idler sprocket wheel 76 is loosely mounted upon shaft 77 which in turn is journaled in bearing 75, sprocket chain 27 in passing from sprocket wheel 23 to sprocket wheel 25 is carried around sprocket wheel 76, said latter sprocket wheel by virtue of its adjustable relationship with the frame plate 3 functioning as a tightening element for the sprocket chain 27. As has been hereinbefore described, the slots 71 in the frame plate 3 are substantially horizontally disposed and hence adjustment of the plate 70 by the manipulation of screw 74 will occur in a substantially horizontal direction. In this fashion a portion of the travel of the chain 27 takes place in a horizontal direction parallel to and immediately above the mold trays 7. A similar plate 77 is similarly mounted upon the opposite frame plate 4, said plate 77 carrying bearing 78 in which shaft 79 is journaled. Shaft 79 in turn supports idler sprocket wheel 80 which engages with sprocket chain 28 in the same fashion as the sprocket wheel 76 engaged with sprocket chain 27. The arrangement is such that the recessed bars or pans 31 during a period of their travel are carried between the idler sprocket wheels 76 and 80 and the sprocket wheels 25 and 26 in a substantially horizontal plane disposed parallel to and immediately above the mold trays 7.

A hopper 81 is mounted upon the upper portion of the machine and comprises end walls 82 and 83 and an inclined side wall 84. End wall 82 is supported by a strap 85 which in turn is secured to the frame plate 3. Similarly, strap 86 supports the end wall 83, said strap being mounted upon frame plate 4. An angle iron 87 is secured at its ends upon the opposite frame plates 3 and 4 respectively, the side wall 84 of the hopper being secured to and supported by the angle iron 87.

The walls 82, 83 and 84 comprise the defining walls of the hopper 81, the bottom of the hopper being open and being disposed adjacent the path of travel of the recessed bars or pans 31 during their passage upwardly. A pair of opposite straps 88, only one of which is illustrated, confines a pair of resilient strips 89 which extend below the lower edges of the end walls 82 and 83 of the hopper. Similarly a strap 90 confines a resilient strip 91 at the lower portion of the side wall 84, the strip 91 extending below the lower edge of the wall 84. During operation of the device the lower edges of the strips 89 and 91 make contact with the upper faces, that is the recessed faces of the plates or pans 31 to render the joints at the lower portion of the hopper 81 with the plates or pans 31 substantially fluid tight.

In operation the hopper 81 is adapted to carry a mass of fruit centers or cores, such as cherries, which are subsequently delivered as units to the mold cavities 8.

A bracket 92 is mounted upon the supporting standard 1, said bracket carrying an upwardly inclined strap 93 which is secured at its upper end upon bracket 94 mounted upon frame plate 3. A block 95 is carried at the upper end of the strap 93 and at its end carries a bearing 96 in which shaft 97 is journaled. A sprocket wheel 98 is keyed to shaft 97 and is driven by sprocket chain 99.

A strap 100 is supported at its lower end upon bracket 92 and is secured to a bracket 101 at its upper end which latter is carried by frame plate 3. Another strap 102 is secured at its upper end to the bearing block 95 and at its lower end is secured to bearing block 95' which in turn is carried by straps 100 and 102. A bearing 103 is carried by the bearing block 95'. A shaft 104 is journaled in bearing 103. A sprocket wheel 105 is keyed to the end of shaft 104, said sprocket wheel being provided with opposite slots 106. A cam 107 is loosely mounted upon shaft 104 and is secured to sprocket wheel 105 by cap screws 108, the arrangement being such that cam 107 may be adjusted radially a limited distance with respect to sprocket wheel 105.

A second sprocket wheel 109 is keyed to shaft 104 and sprocket chain 99 which is trained around sprocket wheel 98 is also trained around sprocket wheel 109.

A bracket 110 is mounted upon the frame plate 3 and carries a shaft 111 upon which is loosely mounted an idler sprocket wheel 112 which engages with sprocket chain 99 and functions as a tightener for said chain. A shaft 113 is journaled in bearings 114 and 115 which are respectively carried by frame plates 3 and 4. An idler sprocket wheel 116 is carried upon shaft 113 and also engages with sprocket chain 99 functioning to tighten said chain.

A sprocket wheel 117 is keyed to shaft 40 and a sprocket chain 118 is trained around said sprocket wheel, said sprocket chain also being trained around sprocket wheel 105. A clamp member 119 is carried upon strap 100, said clamp member, in turn, carrying a shaft 120 upon which an idler sprocket pinion is loosely mounted. A sprocket pinion 121 engages with an intermediate portion of sprocket chain 118 and functions to tighten said chain.

The arrangement is such that when shaft 40 is rotated sprocket wheel 117 drives sprocket wheel 105 through the agency of chain 118. Shaft 104 is thereby rotated which, in turn, drives sprocket wheel 109 over which sprocket chain 99 is trained. In this fashion shaft 97 upon which sprocket wheel 98 is carried is rotated.

A cam 122 having a cam slot 123 is mounted upon shaft 97 and is rotated in timed relationship with shaft 40 and shaft 104. A cam follower roller 124 engages in the cam slot 123, said roller being carried at the end of the follower bar 125. The follower bar 125 is slidably positioned in guide 126 secured to the frame blade 3 and in guide 127 (Fig. 1) secured to frame plate 4, the arrangement being such that when shaft 97 is rotated follower bar 125 is reciprocated by engagement of the follower roller 124 in the curved portion 128 of the cam slot 123.

Adjacent the inner side of frame plate 3, cam follower bar 125 is provided with a slot 129 in which a block 130 is positioned, the block 130 being of lesser dimension than the length of the slot 129. A channeled cap plate 131 is secured to the upper portion of the block 130 by means of cap screw 132, the flanges of the channel plate embracing the outer side portions of the follower bar 125. A plate 133 is secured to the lower portion of the block 130, said plate having an angular extending curved cam finger 134. A block 135 is secured to the lower face of the follower bar 135, said block being provided with a pawl 136 for the reception of a coil spring 137, which at its outer end, bears against the cam finger 134 and at its inner end is adjustably positioned against the end of set screw 138 within the bore 136.

The cam finger 134 is positioned adjacent the path of travel of the lugs 38 carried upon the recessed bars or pans 31 when said bars or pans are carried by the sprocket chains 27 and 28. The timing of the mechanism is such that periodically the cam follower bar 125 reciprocates outwardly with respect to the frame plate 3, that is, when the follower roller 124 engages with the curved portion 128 of the cam slot 123. In thus moving outwardly the cam finger 134 is moved outwardly and makes contact with two adjacent lugs 38 carried by two adjacent recessed bars or pans 31. As has been hereinbefore described the lugs 38 are secured to the slidable apertured plates 37 and hence when the cam finger 134 contacts the lugs 38 and moves them outwardly the apertured plates 37 are moved from a position wherein the apertures are in registration with the mouths of the recesses 33 to a position wherein the apertures 39 are offset with respect to the mouths of the recesses 33. In other words, the plates 37 when thus moved function to partially close the recesses 33. The rate of rotation of the shaft 97 is correlated with the movement of the chains 27 and 28 in such fashion that the bar 125 will reciprocate outwardly once during the passage of two of the recessed bars or pans 31. As will be hereinafter more fully described, at the phase of operation wherein the plates 37 are shifted to closed position, said plates prior to approaching the zone of the cam finger 134 are so disposed as to have their apertures in registration with the mouths of the recesses 33. Hence, reciprocation of the bar 125 outwardly functions to simultaneously move two of the plates 37 to bring the apertures 39 into offset relationship with respect to the mouths of the recesses 33.

In the adjustment of the parts, the cap screw 132 is tightened to such a degree that movement of the plates 37 can be accomplished without displacement of the block 130 within the slot 129 provided in the follower bar 125. However, in the event that the plates 37 are positively restrained from moving within the guides 36, such as may occur if a cherry pit or other solid material may become wedged between the defining edge of an aperture 39 and a defining mouth of a recess 33, the block 130 will shift in the recess 129 against the compression of spring 137 and consequently injury to the parts will not take place. The strength of spring 137 is such that upon the next phase of rotation of the cam 122, the spring 137 will have returned the block 130 to its proper position within slot 129. Hence, although the cam finger 134 will be prevented by some positive obstruction from shifting one pair of plates 37, said cam finger will be immediately returned to its normal position so as to function properly with respect to the next pair of plates which move opposite the cam finger.

Figures 5, 6:
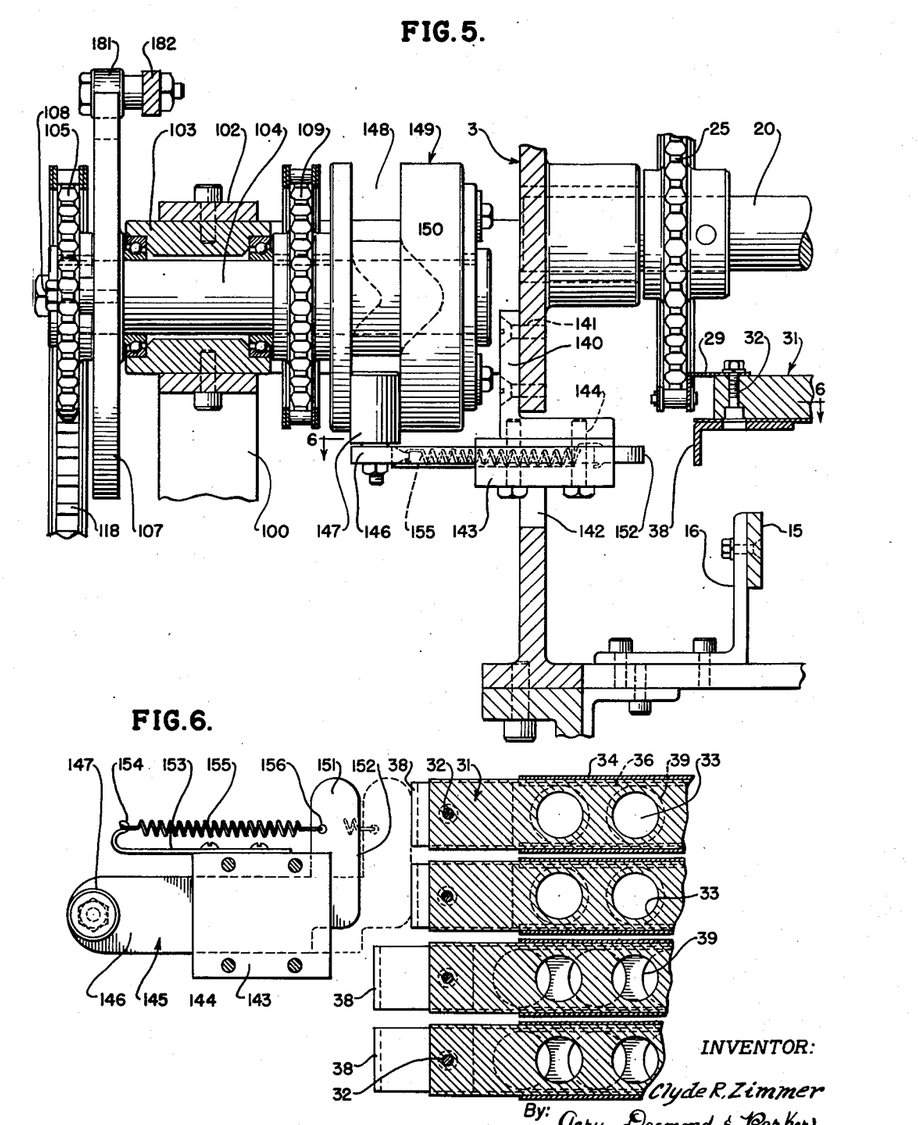
Fig. 5 is an enlarged detailed sectional view taken on line 5—5 of Fig. 2.
Fig. 6 is a detailed plan sectional view taken on line 6—6 of Fig. 5.
Figures 7, 9:
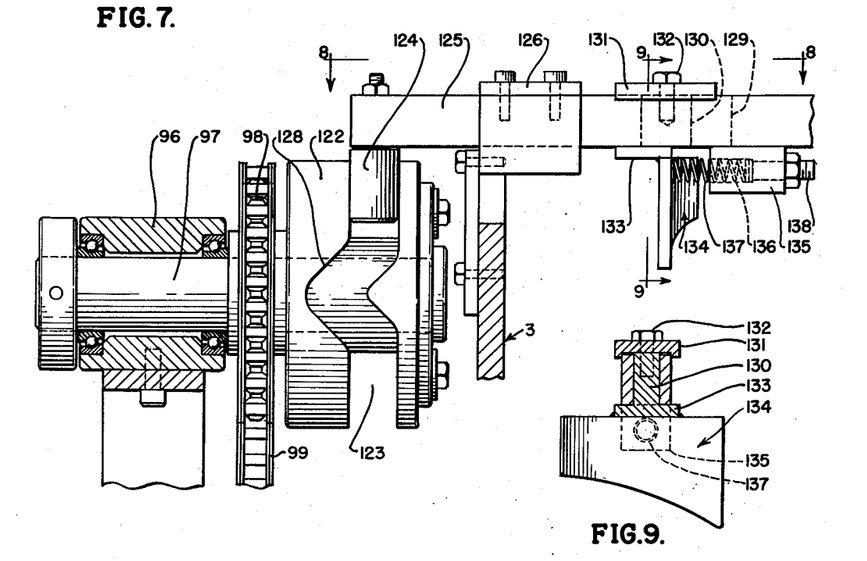
Fig. 7 is an enlarged detailed sectional view taken on line 7—7 of Fig. 2.
Fig. 9 is a detailed transverse sectional view taken on line 9—9 of Fig. 7.
Figure 8:
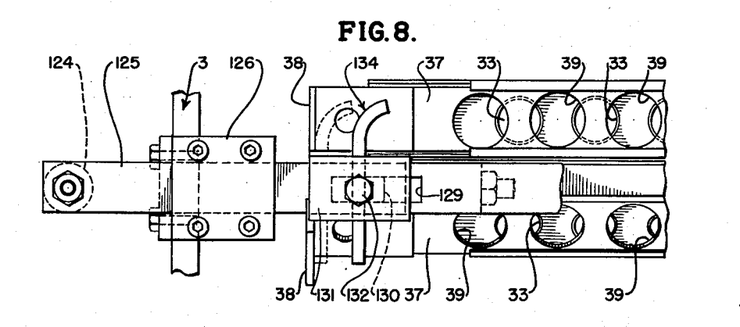
Fig. 8 is a fragmentary plan view of the device shown in Fig. 7 looking in the direction of the arrows 8—8.

Referring particularly to Figs. 5 and 6, an angle bracket 140 is secured to frame plate 3 by means of screws 141. The frame plate 3 is provided with an aperture 142 adjacent sprocket wheel 25 through which one arm of the angle member 40 extends. A guide 143 is positioned in aperture 142 and is secured to the angle member 140 by means of screws 144 and an L-shaped member 145 is slidably positioned in the guide 143.

One arm 146 of the L-shaped member 145 carries a follower roller 147 which is engageable in cam slot 148 of a cam 149, the latter being mounted upon shaft 104 adjacent sprocket wheel 109. The cam slot 148 is provided with a curved portion or dip 150, the function of which will be hereinafter more fully described.

The L-shaped member 145 also carries an arm 151 which is disposed at right angles to the arm 146. The arm 151 has an operating face 152 which is disposed substantially parallel to the lugs 38 carried upon the apertured slides 37. A bracket 153 is mounted upon guide 143 and carries a hook portion 154 at an end thereof upon which one end of coil spring 155 is anchored. The opposite end of the coil spring 155 is anchored in aperture 156 provided in the arm 151.

In the operation of this portion of the device as the shaft 104 rotates the cam follower 147 throughout a major period of the rotation of the cam 149 is disposed in the circumferential portion of the cam slot 148. When the roller 147 engages the dip or curved portion 150 of the cam slot the L-shaped member 145 is slidably moved in the guide 143, the movement taking place to the right as viewed in Figs. 5 and 6, that is, toward the flanges 38. As has been hereinbefore described the flanges 38 and hence the apertured slides 37 were previously moved by the cam 122 so as to offset apertures 39 from the mouths of the recesses 33. The function of the cam 149 is to so move the apertured slides 37 as to bring the apertures 39 in the slides 37 into registration with the respective mouths of the recesses 33. This operation is performed when the L-shaped member 145 is slidably moved in the guide 143 under the influence of the dip 150 in the cam slot 148. The arrangement is such that the contact face 152 of the arm 151 makes contact with two of the flanges 38 and thus moves said two flanges so as to dispose the apertures 39 of two of the slides 37 into registration with mouths 33 of two of the recessed bars or pans 31. It can readily be seen that during one revolution of the shaft 104 two of the apertured slides 37 are moved to bring about the registration hereinbefore described.

A shaft 157 is journaled at its opposite ends in bearings 158 and 159, respectively, mounted upon frame plates 3 and 4. A roll 160 is carried upon an intermediate portion of shaft 157, said roll carrying a plurality of circumferentially disposed tufts 161 of relatively resilient bristles, the roll 160, in effect, constituting a rotating brush designated generally by the reference numeral 162. A sprocket wheel 163 is mounted upon shaft 157 and a sprocket chain 164 is trained around said sprocket wheel, said chain also being trained around a sprocket wheel 165 mounted upon shaft 17. Consequently, when shafts 17 and 20 are rotated, carrying the recessed bars or pans 31 in endless fashion, as hereinbefore described, the rotating brush 162 is moved in timed relationship with the movement of said recessed bars or pans. A shaft 166 is journaled in bearings 167 and 168 respectively mounted upon frame plates 3 and 4. A tube 169 is carried upon an intermediate portion of shaft 166, said tube throughout a substantial portion of its length carries a plurality of relatively flexible tubular vanes 170. The vanes 170 are mounted upon the tube 169 in apertures provided therefor, said vanes being secured in place by screws 171. The vanes 170 are disposed radially and adjacent vanes are offset angularly from each other. The shaft 166 is so mounted with respect to the hopper 81 that the vanes during a portion of their revolution as hereinafter will be described, dip into the interior of the hopper 81, the ends of the vanes moving adjacent the recessed bars or pans 31, and as will be hereinafter more fully described, the peripheral movement of the ends of the vanes is opposite to that of the translatory movement of the recessed bars 31.

A sprocket wheel 172 is mounted upon shaft 166 and a sprocket chain 173 is trained around the sprocket wheel 172 and is also trained around a sprocket wheel 174 mounted upon shaft 157. Hence when the rotating brush 162 is moved, as has been hereinbefore described, the tube 169 carrying the vanes 170 also moves in unison therewith.

In the operation of the machine thus far described, the trays 7 are continuously moved by the conveyor chains 6 between the frame plates 3 and 4. Simultaneously, and in timed relationship with the movement of the chains 6, the shaft 40 is rotated by the sprocket chain 42. Rotation of the shaft 40 results in an intermittent movement of the shafts 17 and 20, the intermittent movement being obtained through the agency of the rocking arms 43 and 58 and the pawl and ratchet arrangement hereinbefore described. In this fashion the chains 27 and 28 move intermittently, and the recessed bars or pans 31 carried by said chains move intermittently in an endless fashion around sprocket wheels 23, 24, 25, and 26 and around the idler pinions 76 and 80.

During a portion of the travel of the recessed bars or pans 31, said pans move beneath the hopper 81, moving in an upwardly inclined direction. The pans then move downwardly, their direction of movement being controlled by the position of the sprocket pinions 76 and 80. Thereafter the pans move in an inverted position in a direction parallel to and adjacent the upper surfaces of the molds. It will be noted that the mold cavities 8 provided in the upper surface of the starch carried in the trays 70 are disposed in rows transverse to the direction of movement of the trays. As has been hereinbefore described, the recesses 33 provided in the bars 31 are disposed adjacent each other forming, in effect, a row of recesses in each bar. There are as many recesses 31 in each bar as there are cavities 8 in each row and the positional arrangement of the recesses and cavities are such that during the inverted horizontal movement of the recessed bars or pans the recesses of each bar will be disposed immediately above the recesses or cavities 8 comprising a predetermined row.

It will be noted, however, that the trays move continuously whereas the bars move intermittently. The arrangement is such that during the intermittent movement of the bars, the registration of the recesses 33 and the cavities 8 will be brought about.

Figure 4:
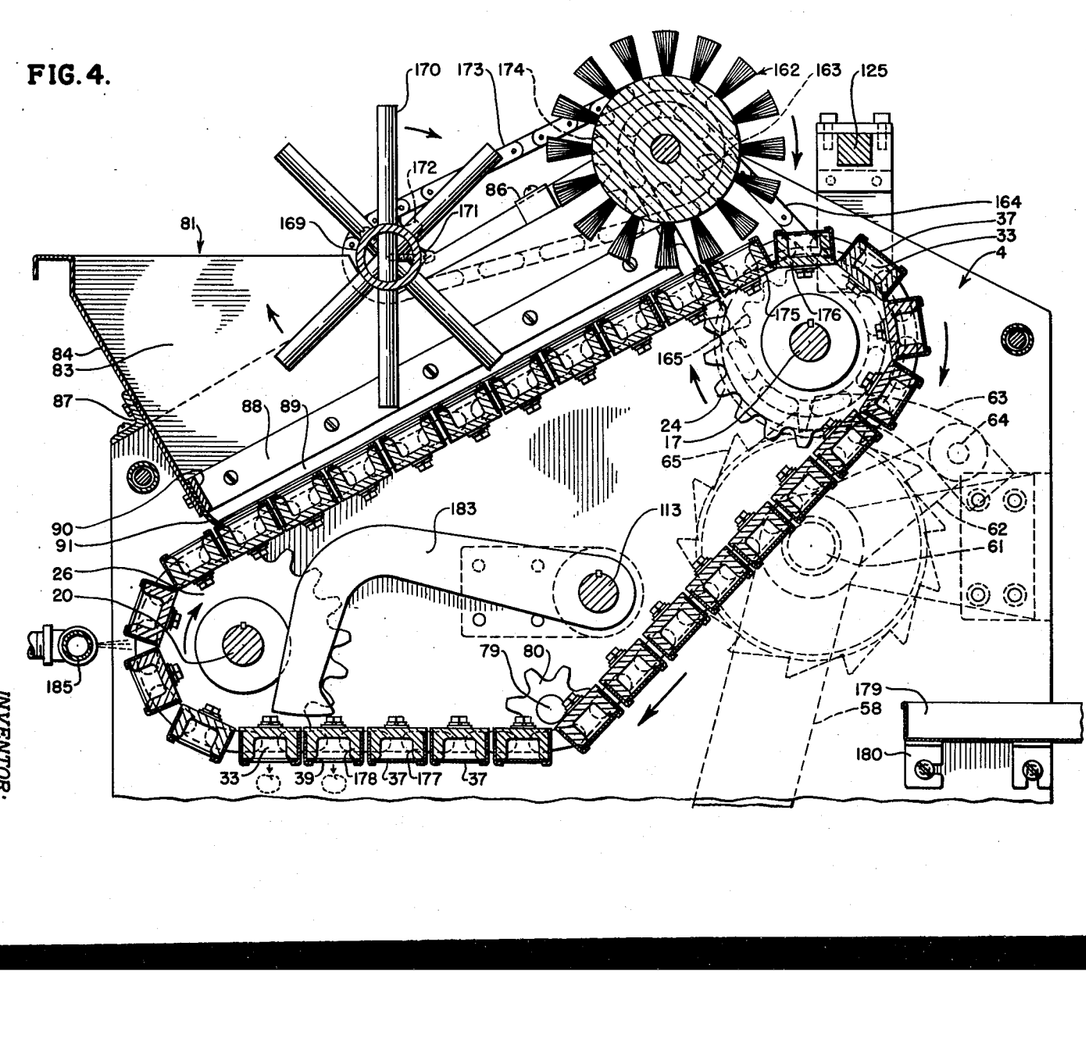
Fig. 4 is an enlarged transverse sectional view taken on line 4—4 of Fig. 1.

Although the recessed bars or pans 31 move intermittently the shafts 97 and 104 upon which cams 122 and 149 are respectively mounted are continuously rotated in timed relationship with the rotation of the shaft 40. It will also be noted that the cam 122 is disposed adjacent sprocket wheel 23, that is, that the apertured slides 37 which are moved by the cam finger 134 are those associated with bars which have reached their uppermost position after passing beneath the hopper 81. In this position the cam finger 134 moves the apertured slides associated with two of the bars so as to offset the apertures 39 of the slides 37 with respect to the mouths of the recesses 33 provided in the two bars 31. Referring particularly to Fig. 4 it will be noted that the recesses of bar 175 are open whereas the recesses of bar 176 adjacent to bar 175 are closed. It is at this point in the travel of the bars that the cam 122 functions to move the slides 37 so as to bring the apertures 39 in offset relationship to the mouths of the recesses 33.

After the recesses in the bars have thus been closed they remain closed until the bars move adjacent the sprocket wheel 25, that is while the bars are moving in a horizontal direction and said bars are inverted.

Referring again to Fig. 4 it will be noted that the recesses 33 of the bar 177 are closed whereas the recesses of the adjacent bar 178 are open. It is at this point that the cam 149 functions to move the apertured slides 37 so as to bring the apertures 39 into registering position with the mouths of the recesses 33.

Thereafter the recesses 33 of the bars remain open, that is with the respective apertures 39 in registration with said recesses, until the bars reach the position indicated by the position of the bar 176. The cam 122 then functions to close said recesses, as hereinbefore described and the cycle is thus repeated.

In the operation of the device the hopper 81 is charged with a mass of centers or cores, which for purposes of description, may be a mass of "Maraschino" cherries. It will be noted that the bars at the lower portion of the hopper 81, namely those bars which, in effect, comprise the floor or bottom of the hopper, have their apertures open. Consequently, the bars in moving under the hopper move beneath the mass of cherries. Such upward movement of the bars would tend to move the mass of cherries upwardly, were it not for the provision of the rotating resilient vanes 170. As has been hereinbefore described, said vanes rotate in the direction of the arrows (Fig. 4) which is opposite to the translatory direction of movement of the bars beneath the vanes. Consequently, the upward movement of the mass of cherries along with the bars is interrupted and the mass is thus moved rearwardly with respect to the direction of travel of the bars. By virtue of the fact that the vanes 170 are relatively resilient the urging force asserted by said vanes upon the cherries will not injure or unduly crush the cherries.

The size or volume of the recesses 33 is such as to conveniently accommodate one unit cherry or core. Hence, when the bars move beneath the hopper 81 a cherry finds its way from the mass into each of the recesses 33. Of course, more than one cherry will attempt to move into each recess but the excess cores or cherries will not be able to completely secrete themselves within the recess and will be carried along with the bars in such fashion as to extend above the mouths of the recesses.

This is the condition which obtains as the bars approach the rotating brush 162. It will be noted that the periphery or extremity of the brush 162 moves in substantially tangential relationship to the upper surface of the bars 31. Consequently, during the rotation of the brush 162 those excess cores or cherries which ride partially in or partially out of the recesses are dislodged from the recesses and urged rearwardly with respect to the movement of the bars. The brush 162, of course, rotates in the direction of the arrow (Fig. 4) which is in a direction contrary to the translatory movement of the bars at this period of operation.

Shortly after passing beneath the brush 162 cam 122 functions, by virtue of the cam finger 134 to simultaneously close the slides 37 of two of the bars. In this fashion the bars, commencing with the bar 176 proceed with the slides 37 offset so as to confine the single cherry in each recess within the recess. The bars then move downwardly to inverted position. The slides 37, however, being in offset position function as closures for the recesses 33 and thus the unit cherry contained in each recess is prevented from falling from the recess even though the bars are in inverted position.

As the operation proceeds the bars eventually reach the horizontal path of travel where the bars are disposed immediately above the passing trays. The timing of the machine is such that when two of the bars are disposed with their recesses immediately above the respective cavities 8, the cam 149 functions to slide the apertured slides 37 so as to bring the apertures 39 into registration with the mouths of the recesses 33 of two of the bars. The cherries contained in the recesses being thus unsupported drop into the respective cavities 8 of the tray 7 passing beneath the bars.

As has been hereinbefore described, the trays 7 move in a continuous manner whereas the bars 31 move intermittently. In order to achieve registration of the recesses 33 in those two bars which have their slides opened by the action of cam 149, the timing of the parts is such that the bars when they move, move slightly faster than the trays 7. This differential in speed of movement permits the desired registration to be secured at the moment when the slides 37 are moved to registering position when the apertures in the slide 37 are moved into registering position with the mouths of the recesses 33. Hence, all of the rows of the cavities 8 will receive their allotted core or cherry.

Figure 10:
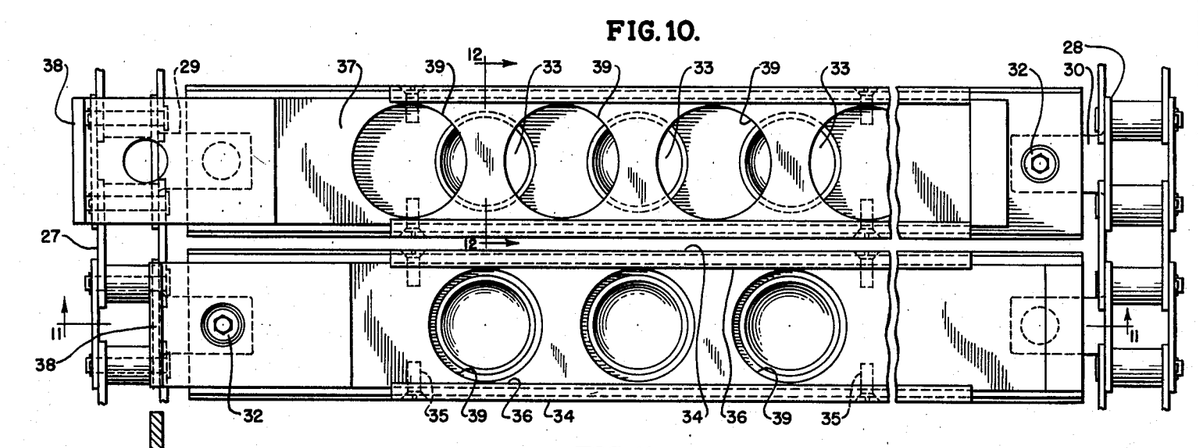
Fig. 10 is a detailed top plan view illustrating two of the conveyor pans, the control plates associated therewith being shown in closed and open position respectively.
Figure 11:
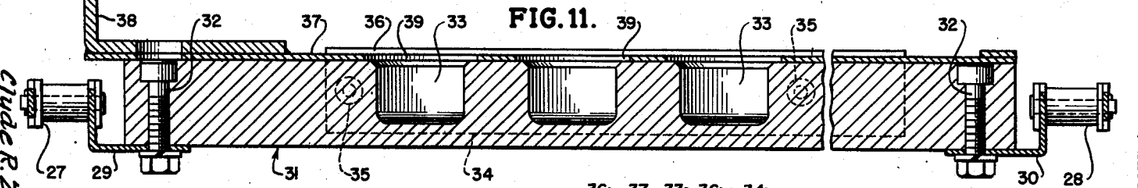
Fig. 11 is a longitudinal sectional view taken on line 11—11 of Fig. 10.
Figure 12:
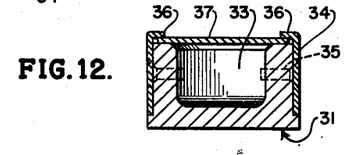
Fig. 12 is a transverse sectional view taken on line 12—12 of Fig. 10.

Of course, the rotating brush 162 essentially prevents the disposition of more than one cherry in each recess 33. Of course, broken portions of cherries may find their way to predetermined recesses in company with a unit cherry. However, this situation is exceptional. The nature of the mass of cherries, however, is such that a quantity of juice finds its way into each recess along with the desired cherry. As has been hereinbefore described, if the core is accompanied by too much juice of liquid, the resulting candy product becomes undesirable. To eliminate the unwanted juice and still retain the cherry in each recess, it will be noted by particular reference to Fig. 10, that when the apertures 39 are offset with respect to the recesses 33 space is provided on each side of the recess for the egress of juice or liquid. In this fashion when the bars are inverted the juice or liquid runs from the recesses and may be caught by a pan 179 carried upon brackets 180 secured to the opposite frame plates 3 and 4.

Figure 2:
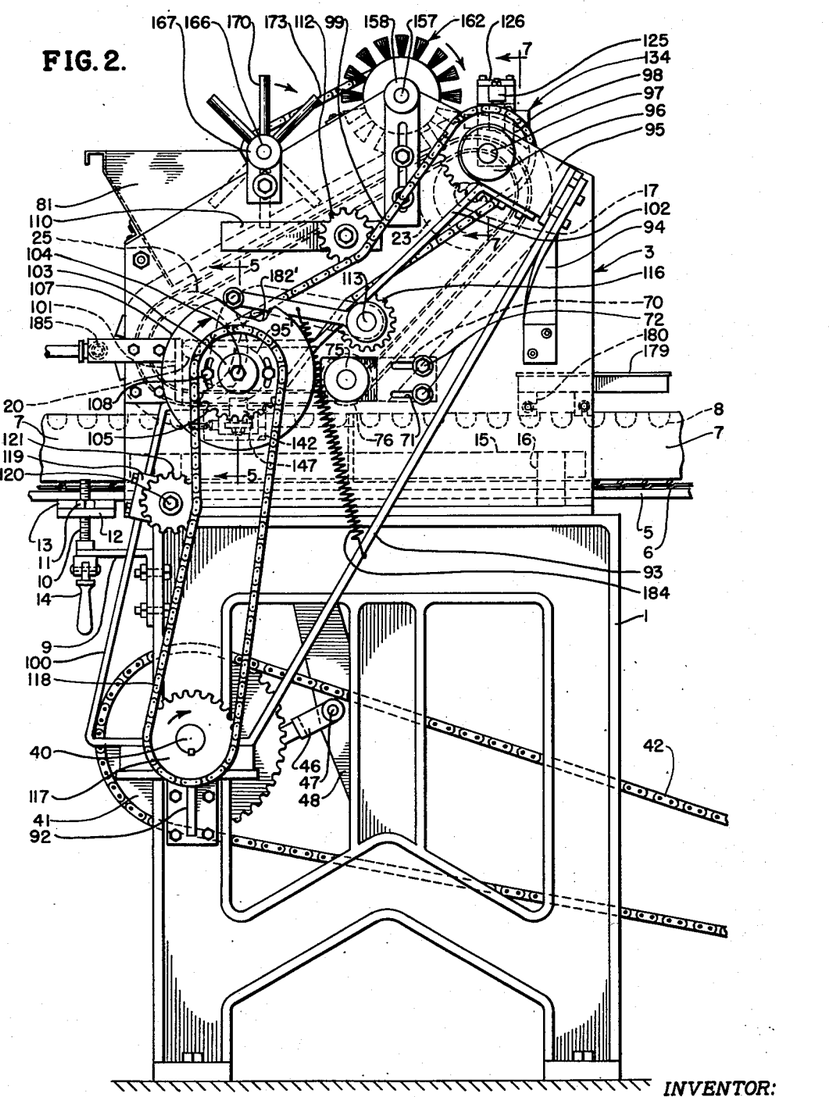
Fig. 2 is an end elevation of the machine shown in Fig. 1.

As has been hereinbefore described some types of food cores such as cherries are adhesive to a degree and hence there is the possibility of a predetermined cherry sticking in a recess even though the bar 37 carrying said recess is inverted. To eliminate this possibility cam 107 is mounted upon shaft 104 and continuously rotates with said shaft. A cam follower roller 181 is carried upon the end of an arm 182 which is rigidly mounted upon shaft 113. This shaft extends across the machine and carries intermediate its length a pair of rapping bars 183 which are spaced from each other along the length of the shaft. The cam roller 181 is maintained in contact with the face of the cam 107 and this cam is provided with an indentation 182' (Fig. 2) at a portion of its periphery. The cam follower 181 is maintained in contact with the face of the cam by means of coil spring 184 which is anchored upon the strap 93. The faces of the rapping bars are of such width as to span portions of two of the bars 31 and the rapping bars are so positioned with respect to the recessed bars or pans 31 that said rapping bars make contact with those recessed bars 31 which have their apertured slides 37 moved to open the recesses 33. Thus, at the time that the recesses 33 are opened, the cam follower roller 181 will reach the dip 182 in the cam periphery and the bars 183 will impart a staccato rap to the rear faces of the recessed bars whose recesses are newly opened. This vibration tends to dislodge any core or cherry which may otherwise remain adhesively secured within the inverted recesses.

After the cores have been discharged from the recessed bars or pans, said latter members continue their travel toward the hopper bottom with the recesses open. In being carried toward the hopper said bars or pans pass adjacent pipe 185 which is provided with a plurality of recesses for the discharge of air under pressure, the streams of air being directed toward the recessed faces of the bars or pans whereby core fragments and other undesirable residue may be removed from the recesses. The pipe 185 may be connected to any suitable source of air under pressure (not shown).

It is apparent that herein is described a machine for automatically depositing cores for candy pieces into preformed mold cavities, excessive liquid or juice being prevented from entering the cavities and substantially only one core being allotted to each cavity. Many modifications of the present machine will suggest themselves to any one skilled in the art and, hence, it is not intended that the invention be limited except as necessitated by the appended claims.

I claim as my invention:

1. A machine for simultaneously depositing in a continuous manner a plurality of centers for candy pieces into a plurality of candy mold cavities provided in a continuously passing candy mold comprising a hopper for carrying a mass of said centers, center-receiving means disposed in supporting relationship to said mass of centers in the hopper, means for intermittently moving said center-receiving means through said hopper in an upwardly inclined direction, said center-receiving means being endless and being provided with a plurality of recesses for the reception of centers in said recesses during movement through the hopper, means carried upon said center-receiving means for obstructing egress of said centers from the recesses, said obstructing means being movable to and from obstructing position, means adjacent the path of travel of said center-receiving means for moving the obstructing means to obstructing position, means for inverting said center-receiving means after said recesses are closed, means for substantially aligning said recesses in inverted position with respective mold cavities provided in a mold continuously moving beneath said inverted center-receiving means, and means adjacent the path of travel of the inverted center-receiving means for removing the obstruction from said recesses while the recesses and cavities are in substantial alignment and while said center-receiving means moves to deposit centers from the recesses into the cavities.

2. A machine for simultaneously depositing in a continuous manner a plurality of centers for candy pieces into a plurality of candy mold cavities provided in a continuously passing candy mold comprising, a hopper for carrying a mass of said centers, endless means positioned in said hopper and provided with a plurality of upwardly opening recesses for receiving a unit center in each recess, said endless means comprising a plurality of parallel disposed elongated members each provided with a row of center-receiving recesses, means for intermittently moving said elongated members moving in endless fashion transversely to their length, means carried upon said members movable to and from obstructing position with respect to said recesses, means disposed adjacent the path of travel of said endlessly moving elongated members for moving said obstructing means to obstructing position to prevent egress of said centers from said recesses, means for inverting said elongated members, means for substantially aligning said recesses in inverted position with respective mold cavities provided in rows parallel to said elongated members in a mold continuously moving in a direction transverse to said rows beneath said inverted elongated members, and means for moving said obstructing means from obstructing position with respect to said recesses while the recesses and cavities are in substantial alignment and while said elongated members are moving to deposit said unit centers from the recesses into the respective cavities.

3. A machine for simultaneously depositing in a continuous manner a plurality of centers for candy pieces into a plurality of candy mold cavities provided in a continuously passing candy mold comprising, a hopper for carrying a mass of said centers, endless means movable through said hopper provided with a plurality of upwardly opening recesses for receiving a unit center in each recess, said endless means comprising a plurality of parallel disposed elongated members each provided with a row of center-receiving recesses, means for intermittently moving said elongated members moving in endless fashion transversely to their length, means carried upon said members for obstructing egress of said centers from said recesses when said elongated members are inverted, means for inverting said elongated members, means for substantially aligning the recesses in a plurality of elongated members in inverted position with respective mold cavities provided in rows parallel to said elongated members in a mold continuously moving in a direction transverse to said rows beneath said inverted elongated members, and means for removing the obstruction from said recesses of a plurality of elongated members while the recesses and cavities are in substantial alignment and while said elongated members are moving to deposit said unit centers from the recesses into the respective cavities, said obstructing means comprising an elongated plate slidably mounted on each elongated member each being provided with a plurality of apertures spaced in conformity with the recesses in each elongated member whereby slidable movement of said plates dispose said plates in obstructing relation to said recesses and in non-obstructing relation when the apertures register with the recesses.

4. A machine for simultaneously depositing in a continuous manner a plurality of centers for candy pieces into a plurality of candy mold cavities provided in rows in a continuously passing candy mold comprising, a hopper for carrying a mass of said centers, a plurality of parallel elongated members each provided with a plurality of recesses, means for carrying said members through said hopper in a direction transverse to their length and with the recesses opening upwardly to receive centers in said recesses, valve means carried by said members for opening and closing said recesses, means disposed adjacent the exit of the members from the hopper for closing said valve means, means for inverting said recessed members, means for substantially aligning the recesses in each inverted member with the mold cavities of a row of cavities provided in the mold continuously moving beneath said inverted recessed members in a substantially straight line, means for moving said inverted members in substantially a straight line parallel to the movement of said mold, and means for opening said valve means while the recesses and cavities are in substantial alignment and while said members move parallel to said mold to deposit centers from the recesses into the cavities.

5. A machine for simultaneously depositing in a continuous manner a plurality of centers for candy pieces into a plurality of candy mold cavities provided in a continuously passing candy mold comprising, a hopper for carrying a mass of said centers, endless means movable through said hopper provided with a plurality of recesses for receiving a unit center in each recess, means for intermittently moving said endless means, movable means carried by said endless means for obstructing said recesses, means disposed adjacent the path of travel of said endless means for moving said obstructing means to obstruct egress of said centers from said recesses when said recessed means is inverted, means for inverting said recessed means, means for intermittently substantially aligning said recesses in inverted position with respective mold cavities provided in a mold continuously moving beneath said inverted recessed means, and means for moving said obstructing means to non-obstructing position while the recesses and cavities are in substantial alignment to deposit said unit centers from the recesses into the respective cavities.

6. A machine for simultaneously depositing in a continuous manner a plurality of centers for candy pieces into a plurality of candy mold cavities provided in a continuously passing candy mold comprising, a hopper for carrying a mass of said centers, endless means movably positioned in said hopper and forming a bottom therefor, said endless means being provided with a plurality of recesses for the reception of centers from said hopper, wiping means carried by said hopper for removing excess centers from the surface of said endless means, valve means carried by said endless means to obstruct egress of said centers from said recesses when said endless means leaves said hopper, means for inverting said endless means, means for substantially aligning said recesses in inverted position with respect to mold cavities provided in a mold continuously moving beneath said inverted recesses, in a substantially straight line, means for moving said endless means in a substantially straight line substantially parallel to the movement of said molds, and means for opening said valve means while the recesses and cavities are in substantial alignment and while said endless means moves substantially parallel to the movement of said molds to deposit said centers from the recesses into the cavities.

7. A machine for simultaneously depositing in a continuous manner a plurality of centers for candy pieces into a plurality of candy mold cavities provided in a continuously passing candy mold comprising, a hopper for carrying a mass of said centers, endless means movably positioned in said hopper and forming a bottom therefor, said endless means being provided with a plurality of recesses for the reception of centers from said hopper, brush means carried by said hopper for removing excess centers from the surface of said endless means, valve means carried by said endless means to obstruct egress of said centers from said recesses when said endless means leaves said hopper, means for inverting said endless means, means for substantially aligning said recesses in inverted position with respect to mold cavities provided in a mold continuously moving beneath said inverted recesses, in a substantially straight line, means for moving said endless means in a substantially straight line substantially parallel to the movement of said molds, and means for opening said valve means while the recesses and cavities are in substantial alignment and while said endless means moves substantially parallel to the movement of said molds to deposit said centers from the recesses into the cavities.

8. A machine for simultaneously depositing in a continuous manner a plurality of centers for candy pieces into a plurality of candy mold cavities provided in a continuously passing candy mold comprising, a hopper for carrying a mass of said centers, endless means having an upper and lower pass, said endless means at its upper pass forming an upwardly inclined bottom for said hopper for supporting said centers, movable fingers positioned in said hopper with their ends disposed adjacent said endless means, said fingers being movable contrary to the movement of said endless means to retrogressively move said centers upon said endless means, said endless means being provided with a plurality of recesses for the reception of centers from the hopper, valve means for obstructing egress of the centers from predetermined recesses as predetermined portions of said endless means leave the hopper and moves upon its lower pass, means for substantially aligning said recesses with cavities provided in a mold moving beneath the lower pass of the endless means in a substantially straight line, means for carrying the lower pass of said endless means in a substantially straight line substantially parallel to the movement of said mold, and means for opening said valve means while the recesses and cavities are in substantial alignment and while said endless means and mold move substantially parallel to deposit said centers from the recesses to the cavities.

9. In a device for carrying and discharging centers for candy pieces which comprises, a plurality of relatively elongated members disposed laterally adjacent each other and movable in endless fashion at right-angles to their length, each of said members having a plurality of recesses disposed in a row along the length of the member, an apertured plate slidably disposed upon each of said members and movable to open and close said recesses, cam means disposed adjacent the path of travel of said members for moving said plates to close said recesses to confine centers in said recesses, and a second cam means spaced from said first-mentioned cam means and disposed adjacent the path of travel of said members for moving said plates to open the recesses to permit discharge of the centers from the recesses.

10. In a device for carrying and discharging centers for candy pieces which comprises, a plurality of relatively elongated members disposed laterally adjacent each other and movable in endless fashion at right-angles to their length, each of said members having a plurality of recesses disposed in a row along the length of the member, an apertured plate slidably disposed upon each of said members and movable to open and close said recesses, cam means disposed adjacent the path of travel of said members for moving said plates to close said recesses to confine centers in said recesses, means for operating said cam means in timed relationship with the movement of said members, and a second cam means spaced from said first-mentioned cam means and disposed adjacent the path of travel of said members for moving said plates to open the recesses to permit discharge of the centers from the recesses.

11. A machine for simultaneously depositing in a continuous manner a plurality of centers for candy pieces into a plurality of candy mold cavities provided in a continuously passing candy mold comprising, a hopper for carrying a mass of said centers, endless means positioned in said hopper and provided with a plurality of upwardly opening recesses for receiving a unit center in each recess, means upon said recessed means for obstructing egress of said centers from said recesses, means for inverting said recessed means, a mold having a plurality of mold cavities, means for continuously moving said mold in a substantially straight line, means for moving said endless means in a substantially straight line substantially parallel to the movement of said mold for a substantial portion of the mutual travel of said endless means and mold and with said recesses in substantial alignment with said mold cavities, and means for removing the obstructions from said recesses while the substantially aligned recesses and cavities move with said endless means and mold, respectively, along said parallel lines to deposit said unit centers from the recesses into the respective aligned cavities.

CLYDE R. ZIMMER.

References Cited in the file of this patent

UNITED STATES PATENTS

| Number | Name | Date |
|---|---|---|
| 1,756,222 | Swett | Apr. 29, 1930 |
| 1,763,083 | Bausman | June 10, 1930 |
| 1,763,084 | Bausman | June 10, 1930 |
| 2,566,712 | Zeun | Sept. 4, 1951 |